US010915819B2

(12) United States Patent
Pickover et al.

(10) Patent No.: US 10,915,819 B2
(45) Date of Patent: Feb. 9, 2021

(54) AUTOMATIC REAL-TIME IDENTIFICATION AND PRESENTATION OF ANALOGIES TO CLARIFY A CONCEPT

(71) Applicant: International Business Machines Corporation, Armonk, NY (US)

(72) Inventors: Clifford A. Pickover, Yorktown Heights, NY (US); Robert J. Schloss, Briarcliff Manor, NY (US); Komminist S. Weldemariam, Canada (KE); Lin Zhou, LaGrangeville, NY (US)

(73) Assignee: International Business Machines Corporation, Armonk, NY (US)

( * ) Notice: Subject to any disclaimer, the term of this patent is extended or adjusted under 35 U.S.C. 154(b) by 751 days.

(21) Appl. No.: 15/200,243

(22) Filed: Jul. 1, 2016

(65) Prior Publication Data

US 2018/0005116 A1    Jan. 4, 2018

(51) Int. Cl.
*G06N 5/02* (2006.01)
*H04L 29/08* (2006.01)
(Continued)

(52) U.S. Cl.
CPC .............. *G06N 5/02* (2013.01); *G06N 5/022* (2013.01); *G06Q 30/0201* (2013.01);
(Continued)

(58) Field of Classification Search
CPC .......... G06F 3/011; G06F 3/012; G06F 3/013; G06F 3/017; G06F 3/0481; G06F 21/32;
(Continued)

(56) References Cited

U.S. PATENT DOCUMENTS 5,442,745 A    8/1995  Hirose
6,523,026 B1   2/2003  Gillis
(Continued)

FOREIGN PATENT DOCUMENTS

CA        2311439 A1      10/2001
WO    WO2007092430 A2     8/2007
WO    WO2013006285 A1     1/2013

OTHER PUBLICATIONS

Zhnag et al., Mental State Detection of Dialogue System Users via Spoken Language, 2003. (Year: 2003).*
(Continued)

*Primary Examiner* — Vincent Gonzales
*Assistant Examiner* — Marshall L Werner
(74) *Attorney, Agent, or Firm* — Scully, Scott, Murphy & Presser, P.C.; Shimon Benjamin (57) ABSTRACT

A method is disclosed including presenting a concept to a user via one or more presentation devices and monitoring the user's response to the presentation of the concept by a sensing device. The sensing device may generate sensor data based on the monitored user's response. The method further includes determining based on the sensor data generated by the sensor that the user requires clarification of the presented concept. In response to determining that the user requires clarification of the presented concept, the method further includes identifying an analogy that is configured to clarify the presented concept and presenting the identified analogy to the user via one or more of the presentation devices.

20 Claims, 5 Drawing Sheets

(51) Int. Cl.
  *G06Q 30/02* (2012.01)
  *G06Q 50/00* (2012.01)
  *G06N 3/02* (2006.01)
(52) U.S. Cl.
  CPC .............. *G06Q 50/01* (2013.01); *H04L 67/22* (2013.01); *G06N 3/02* (2013.01)
(58) Field of Classification Search
  CPC ........... G06Q 30/0201; G06Q 30/0269; G06Q 50/01; H04L 67/22; H04L 67/306; G10L 25/63; G06K 9/00355; G06N 5/02
  See application file for complete search history.

(56) References Cited

U.S. PATENT DOCUMENTS

| | | | |
|---|---|---|---|
| 6,883,146 | B2 | 4/2005 | Prabhu et al. |
| 6,890,181 | B2 | 5/2005 | Warneke et al. |
| 7,478,090 | B2 | 1/2009 | Aparicio, IV et al. |
| 8,602,793 | B1 | 12/2013 | Sniedzins |
| 2004/0072130 | A1* | 4/2004 | Safran, Sr. ............... G09B 7/02 434/169 |
| 2008/0140422 | A1* | 6/2008 | Hovestadt ............... G10L 15/26 704/275 |
| 2009/0100383 | A1 | 4/2009 | Sunday et al. |
| 2010/0235175 | A1 | 9/2010 | Donovan et al. |
| 2013/0149689 | A1 | 6/2013 | DeGross |
| 2014/0152629 | A1 | 6/2014 | So et al. |
| 2014/0207819 | A1 | 7/2014 | Hiremath et al. |
| 2016/0313868 | A1* | 10/2016 | Weng ..................... H04L 67/12 |
| 2016/0379232 | A1* | 12/2016 | Alonso ................. G06Q 10/00 705/7.33 |

OTHER PUBLICATIONS

Jaksic et al., The Effectiveness of Social Agents in Reducing User Frustration, CHI 2006, p. 917-922, Apr. 2006. (Year: 2006).*

Zhang et al., Mental State Detection of Dialogue System Users via Spoken Language, 2003. (Year: 2003).*

Bertrand, Gregor, Situation- and User-Adaptive Dialogue Management, Feb. 2015 (Thesis defense date). (Year: 2015).*

* cited by examiner

AUTOMATIC REAL-TIME IDENTIFICATION AND PRESENTATION OF ANALOGIES TO CLARIFY A CONCEPT

FIELD

The present application relates generally to automatic real-time identification and presentation of analogies to users for clarifying presented concepts.

BACKGROUND

Analogies play an important role in learning and in many diverse areas of our lives. For example, consider a farmer in a rural area who is told that he should use less than 10,000 liters of water or that he will receive this amount over the next month. Quantities such as this are difficult to visualize or understand. However, by giving the farmer an appropriate analogy, the farmer is able to better assimilate, understand, act on, and plan. This same kind of logic applies to diverse fields including education, giving directions when driving or in other instructional material.

Analogy plays a role in problem solving including, decision making, perception, memory, creativity, emotion, explanation, and communication. Analogies lay behind basic tasks such as the identification of places, objects and people, for example, in face perception and facial recognition systems.

Specific analogical language includes exemplification, comparisons, metaphors, similes, allegories, and parables. Analogy contributes not only in ordinary language and common sense (where proverbs and idioms give many examples of its application) but also in science, philosophy, and the humanities. The concepts of association, comparison, correspondence, mathematical and morphological homology, homomorphism, iconicity, isomorphism, metaphor, resemblance, and similarity are closely related to analogy.

BRIEF SUMMARY

The methods, systems, and computer program products described herein provide ways to automatically and in real-time identify and present analogies to users for clarifying presented concepts.

In an aspect of the present disclosure, a method is disclosed including presenting a concept to a user via one or more presentation devices and monitoring the user's response to the presentation of the concept by a sensing device. The sensing device may generate sensor data based on the monitored user's response. The method further includes determining based on the sensor data generated by the sensor that the user requires clarification of the presented concept. In response to determining that the user requires clarification of the presented concept, the method further includes identifying an analogy that is configured to clarify the presented concept and presenting the identified analogy to the user via one or more of the presentation devices.

In an aspect of the present disclosure, the method may further include monitoring a user's response to the presentation of the identified analogy by the sensing device. The sensing device may generate sensor data of the user's response to the identified analogy. The method may further include determining based on the generated sensor data of the user's response to the identified analogy that further clarification of the presented concept is required. In response to determining that further clarification of the presented concept is required, the method may further include identifying an additional analogy that is configured to clarify the presented concept and presenting the identified additional analogy to the user via one or more of the presentation devices.

In aspects of the present disclosure apparatus, systems, and computer program products in accordance with the above aspect may also be provided.

Further features as well as the structure and operation of various embodiments are described in detail below with reference to the accompanying drawings. In the drawings, like reference numbers indicate identical or functionally similar elements.

DETAILED DESCRIPTION

The methods, systems, and computer program products described herein may automatically detect or estimate a need for the clarification of a concept, recommendation, and/or communication that is provided to a user in real-time. When a need for clarification is detected or estimated, the methods, system, and computer program products may determine an analogy that has a familiarity to the user and a connotation that will assist in clarifying the concept, recommendation, and/or communication, and may convey the determined analogy in a manner that the user is likely to understand that the analogy is an analogy and not a change of subject. Example categories of analogies that may be used include, for example, exemplification, comparisons, metaphors, similes, allegories, and/or parables.

Figure 1:
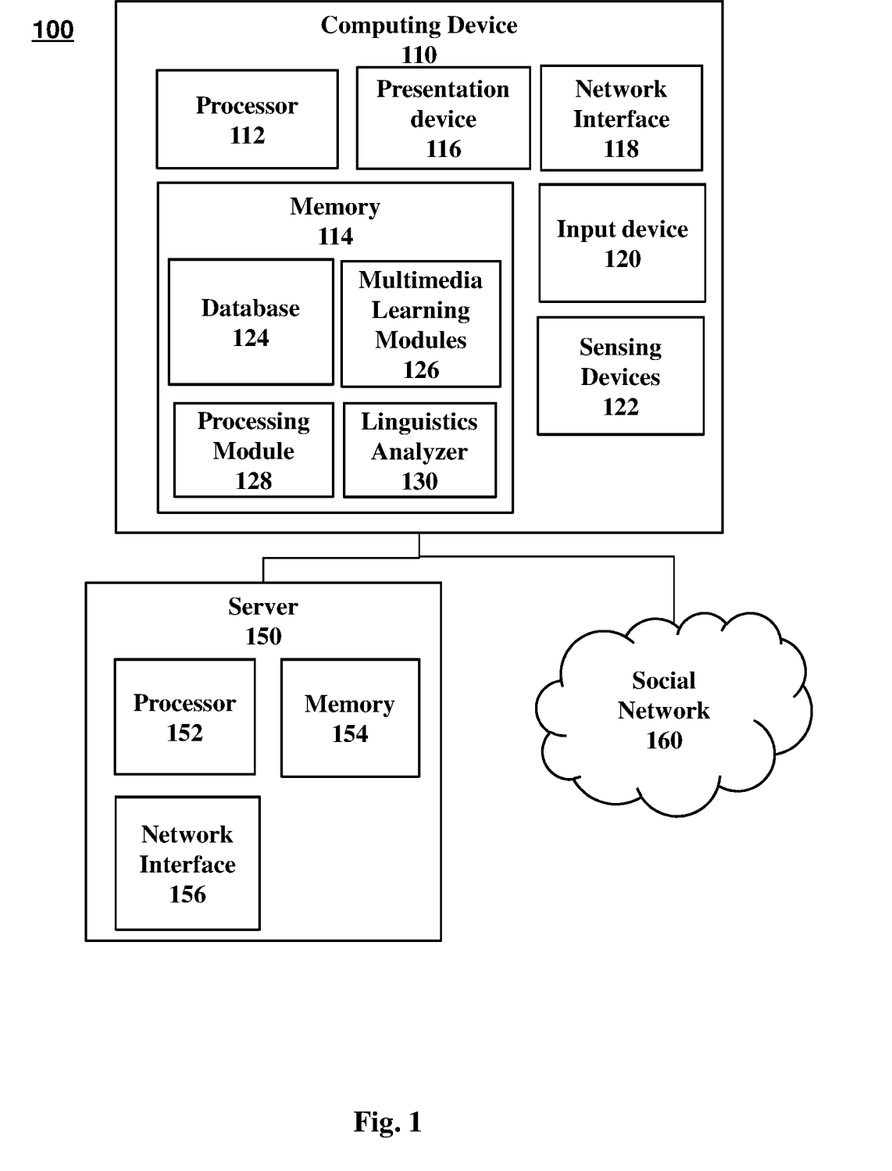
FIG. 1 is a system diagram of a system for automatic real-time identification and presentation of analogies to users for clarifying presented concepts in accordance with an aspect of the present disclosure.

Referring now to FIG. 1, a system 100 is disclosed. System 100 may include, for example, a computing device 110 and a server 150. Computing device 110 may include, for example, at least one processor 112, memory 114, a presentation device 116, a network interface 118, input device 120, sensing device 122, and any other feature common to a computing device. Computing device 110 may include, for example, personal computer, tablets, laptops, smart phones, smart watches, smart wearable devices, earpieces, virtual reality systems, or other similar computing devices. Server 150 may include at least one processor 152, memory 154, a network interface 156, and any other feature commonly found in a server.

Memory 114 may include instructions, software, and/or programs that may be executed by processor 112. In some aspects, memory 114 may include a database 124. Database 124 may store analogies in a format that may be searchable by computing device 110. Database 124 may store data related to a user or group of users to which the concept is being presented. For example, database 124 may store user models for a plurality of users including, for example, a user profile such as age, demographics, learning disorders, or other similar profile information, activity logs (extracted both from the user device and from interaction with the user, and social media interactions or activities); cohorts e.g. educational level, medical records, or any other factor that may be relevant to the selection of an analogy. In some aspects, database 124 may be stored in another location including, for example, in a memory 154 of server 150. For example, in some aspects, database 124 may be stored in a remote storage location, on the cloud, or in any other storage location.

Presentation device 116 may be any device or system that is configured to convey information to a user. Presentation device 116 may include, for example, a computer display, television displays, smart device displays, smart phone displays, smart watch displays, projectors, a virtual reality headset display, or any other display or screen capable of visually presenting information to a user. Presentation device 116 may also or alternatively include audio presentation means including, for example, speakers, earbuds, or any other way of audibly presenting information to a user. In some aspects, presentation device 116 may be more than one device. For example, presentation device 116 may include separate visual and audio presentation devices. In some aspects, the visual and audio presentation devices may be included in the same presentation device 116. In some aspects, information may be presented to the user in both visual and audio form at the same time. In some aspects, the information may be printed on a tangible item, for example, a piece of paper, and presented to the user.

Network interface 118 may be configured to communicate with server 150, another computing device, the internet, or any other device, via wired or wireless technology. For example, network interface 118 may communicate with a network interface 156 of server 150.

Input device 120 may include a mouse, keyboard, gamepad, touch screen, or any other input device that provides a user with the capability to interact with computing device 110.

Sensing device 122 may include any sensing device such as, for example, a microphone, digital camera, video camera, biometric sensors and/or other similar sensing devices that may generate data about a user or group of users of associated with computing device 110. Biometric sensors may include, for example, heart rate/pulse sensors, breathing sensors, eye dilation sensors, or other similar sensors that may generate sensor data about the user. For example, sensing device 122 may be configured to monitor and sense facial expressions, verbal statements, biometrics, gestures, a cadence or pause in the speech of a user, a hesitation in a response of a user, or other similar information and to generate sensor data based on the sensed information. For example, computing device 110 may apply image processing techniques to the sensed information to determine the user's facial expression or changes in the user's facial expression. The sensor data may be provided to computing device 110 and may be stored in memory 114, database 124, may be transmitted via network interfaces 118 and 156 to server 150 for storage in memory 154, on the internet, in the cloud, on a remote server, and/or in any other location.

In some aspects, system 100 may receive characteristic data about a user or group of users. The characteristic data may be stored, for example, in memory 114, database 124, memory 154, on the internet, in the cloud, on a remote server, and/or in any other location. System 100 may analyze the received characteristic data to determine characteristics of the user or group of users. In some aspects, characteristic data may include, for example, a level of education obtained, a source of the education, a country of origin, a country of residence, past and present hobbies, past and present work experience, etc. In some aspects, the characteristic data may also include medical history of the user or group of users that may affect the user or group of users' ability to understand a concept and a related analogy including learning disorders, or other similar medical conditions that may affect a user or group of user's ability to understand a concept. In some aspects, the characteristic data may also include characteristics of the user or group such as, for example, age, demographics, or other similar characteristics that may be relevant to the selection of an analogy for the concept. The characteristic data may be used by system 100 during selection of an analogy for the concept. The received characteristic data may be stored in memory 114, database 124, memory 154, or may be stored in any other location.

In some aspects, system 100 may monitor a user's activities and generate activity data based on the activities. For example, system 100 may monitor the user's hobbies, the user's use of analogies, the user's word choices and communications, any meetings attended by the user, the user's reading material, or other similar activities performed by the user. The activity data may be used by system 100 during selection of an analogy for the concept. The activity data may be stored in memory 114, database 124, memory 154, or may be stored in any other location.

In some aspects, the components of system 100 may communicate or otherwise interact with one or more social networks 160. Social networks 160 may include any network in which users communicate, share, or otherwise interact in a social manner. Examples of common social networks include Facebook®, Twitter®, Pinterest®, Instagram®, Snapchat®, Myspace®, or other similar social networks. System 100 may, for example, determine a degree centrality, closeness centrality, betweenness centrality, eigenvector centrality, percolation centrality, and/or cross-clique centrality of a user or group of users based on data received from social networks 160. For example, if 90% of a user's social network is interested in particular topic, e.g., athletic activities, hobbies, or any other topic, system 100 may determine that an analogy based on the particular topic is more likely to clarify the concept, recommendation, and/or communication that is provided to the user. In some aspects, system 100 may also determine additional characteristics of the user based on the data received from social networks 160 including, for example, an indication of a level of education, interests, location, or other similar characteristics. For example, system 100 may search the user's profile information to determine characteristics of the user. In some aspects, for example, system 100 may monitor the user or group of users' activity by analyzing the data about the user or group of users received from social networks 160. The social network data may be used by system 100 during selection of an analogy for the concept.

Social network data received from social networks 160 may be stored in memory 114, database 124, memory 154, or may be stored in any other location.

In some aspects, the characteristic data, activity data, and social network data may be combined to form a user model for each user. The user model may include the data found in the characteristic data, activity data, and social network data. For example, the user model may include a user profile such as age, demographics, learning disorders, or other similar characteristics; activity logs (extracted both from the user device and interaction, and social media interactions or activities); cohorts e.g. educational level, medical record, etc. User models for a plurality of users may be stored in one or more of memory 114, database 124, memory 154, one or more external databases, the cloud, the internet, or in any other location. In some aspects, a light weight version (e.g., reduced size specific to a particular user or group of users) of a database storing the user models may be stored on the computing device 110.

In some aspects, various machine learning techniques may be used by computing device 110 or another device to build user models. For example, updated or new characteristic data, activity data, social network data, and data sensed by sensing devices 122 about a user may be used as samples for training a machine learning model. The machine learning model may then be used to output or generate the updated user model. As new data is received, the machine learning model may be continuously retrained using new samples and the user model may be continuously updated or generated. In some aspects, the user models may be stored and deployed on the computing device 110. In some aspects the user models may instead be stored and deployed via the internet, cloud or remotely and computing device 110 may access the user models via the use of an application program interface (API).

Computing device 110 may be configured to scan or search database 124 to find an appropriate analogy for conveying or clarifying the concept, recommendation, and/or communication to the user or group of users. The analogies may be stored in database 124 using coded information. For example, a numerical code may be created for each analogy stored in database 124. Computing device 110 read and/or search database 124 based on the numerical codes to find a particular analogy or group of analogies that may clarify or convey the concept. In some aspects, computing device 110 may use searching, selection or matching algorithms (e.g. traditional query, semantic based searching algorithms, pattern detection algorithms, similarity/clustering matching algorithms, etc.) that take the search or selection or matching query and process it against the target database containing the analogies. In some aspects, the analogy database may be implemented in traditional database, graph based database or other similar databases. In some aspects, the user model for a user may include data that corresponds to the numerical code of an analogy. For example, if the numerical code for an analogy indicates that the analogy is relevant to a particular region or country, and the user model for the user includes data indicating that the user is from or in some way associated with the particular region or country, computing device 110 may use this information when searching to find analogies having that particular code. In some aspects, a user's user model may include specific associations to particular codes. For example, the user model for a user may include the codes for analogies that may be of particular relevance to the user.

In some aspects, computing device 110 may also search the internet, cloud, or other sources for analogies. For example, computing device 110 may perform a web based search for analogies. In some aspects, computing device 110 may use a custom software utility to perform the web based search, for example, a specifically designed Web crawling utility with an "analogy" specific crawling policy for the user and the concept. The crawling policy may control the behavior of a custom Web crawler software utility. The crawling policy may include, for example, a selection policy which may specify the pages to be downloaded, a re-visit policy which may specify how often or when to check for changes to the pages, a politeness policy which may specify how to avoid overloading Web sites with download requests, and a parallelization policy which may state how to coordinate a plurality of distributed web crawlers. In various aspects, the crawling process may be implemented online or offline. In some aspects, natural language processing may be used by computing device 110 to find appropriate analogies for clarifying or conveying the concept.

Computing device 110 may present an analogy of a concept to the user or group of users in a number of different ways based on the particular analogy, the setting in which the analogy is to be presented, the user or group of users to which the analogy is to be presented, based on the user profiles of the user or group of users. For example, in some aspects, the analogy may be presented via presentation device 116 as an image, text, audio, or other forms of presentation. For example, if a farmer is told that he is limited to 10,000 gallons of water in a month, an analogy of 10,000 gallons may be provided via presentation device 116 in the form of an image of a water storage tank known or recognizable to the farmer. In some aspects, computing device 110 may present an analogy in textual form on presentation device 116. In some aspects, computing device 110 may present an analogy in audio form by presentation device 116, for example, via a speaker, earpiece, etc. In some aspects, computing device 110 may present an analogy in a combination of any of the above forms, for example, the analogy may be presented in a combined audio and visual presentation by presentation device 116.

In some aspects, for example, computing device 110 may present an analogy to a user or group of users in real-time based on the detection by computing device 110 of a lack of clarity or understanding of a concept in the user or group of users. For example, content may be presented to the user or group of users using presentation device 116. Sensing device 122 may generate sensor data about the user or group of users' response to the presented content in real-time and may provide computing device 110 with the sensor data. Computing device 110 may determine based on the sensor data that the user or group of users require clarification or explanation of the concept. In response to determining that the user or group of users requires clarification or explanation of the concept, computing device 110 may determine an appropriate analogy to convey a clarification or explanation of the concept to the user or group of users, for example, by searching database 124 for an appropriate analogy. Computing device 110 may present the analogy in real-time to the user or group of users via presentation device 116. In some aspects, the computing device 110 may additionally or alternatively present the analogy in real-time to a teacher, for example, via an earpiece, based on the detection of the lack of clarity or understanding and the teacher may then provide the analogy to the group.

In some aspects, the mode of transmission or presentation of the analogy to the user or group of users may be automatically chosen by computing device 110. Some example modes of transmission may include, for example, visually as an image or text, e.g. on a smart phone, tablet, projection, or computing screen. Another example of a mode of transmission may include through spoken words via an audio output, for example, a speaker or earpiece. Another example of a mode of transmission may include visual methods, e.g. photos or graphics that highlight or demonstrate an analogy. Another example of a mode of transmission may include immersive virtual reality.

In some aspects, the modality of presentation may be determined based on one or more of a device in use, cognitive characteristics of the user, a complexity of the analogy (e.g., does the analogy require photos or diagrams or cartoon characters to aid understanding beyond the use of words), network bandwidth (e.g., if a network is slow, text may be used instead of images, if the network is fast, animated images maybe used, etc.), and/or other similar considerations. The modality of presentation may be determined automatically by computing device 110 based on any of these considerations. In some aspects a context of the user may be used to determine the modality of presentation, for example, if a teacher is teaching a class, the computing device 110 may "whisper" the analogy into an earpiece so as not to disrupt the class, while still being useful to the teacher. The context may be determined automatically, e.g. by known geolocation means, via sensing device 122, or in another similar manner. The context may automatically trigger the use of a particular mode of presentation.

The mode of transmission or presentation may be automatically chosen by computing device 110 based on an analysis of the recipient group of users. In some aspects, the analysis of the recipient group of users may be based on the user model of the user or group of users including, for example, the user profile, sensor data, characteristic data, activity data, and/or social network data stored in memory, 114, database 124, memory 154, received from social network 160, or from any other source. For example, computing device 110 may employ various algorithms to intelligently decide on a particular analogy type and modality (e.g. image, text, voice, 3 D, etc) from the recommended list of analogies. Computing device 110 may, for example, use the current criteria of the user activity and context when determining the appropriate analogy and modality of presentation. For example, if the user has received presentation of the concept via a mobile device, the mobile device may be selected as the modality of presentation for the analogy. For example, the analogy may be presented as a text message, image, e-mail, etc. via the mobile device.

In some aspects, user criteria for modality of presentation of the analogy may be specified or modified by the user in the user's settings on computing device 110. For example, if the user is hearing impaired, the user may specify in the user criteria that audio presentation of the analogy should not be used or that visual presentation is the preferred modality of presentation. Likewise, if the user is illiterate, a verbal or spoken word presentation of the analogy may be used. In another aspect, the user model for the user may include an indication of a preferred modality of presentation that may be used by computing device 110 to determine the modality of presentation.

In some aspects, for example, a group of users may be presented with a concept via a common display device 116, e.g., a television set, computer monitor, projection image, etc., but the modality of presentation of the analogy to the user or group of users may determined to be each user's device. This may occur when, for example, computing device 110 determines based on user models for each user that one or more of the user's requires a different analogy as compared to the others. For example, a first user may be from a first region or country and a second user may be from a second region or country. Computing device 110 may determine that a first analogy having a basis in the first region or country is the appropriate analogy for the first user and that a second analogy having a basis in the second region or country is the appropriate analogy for the second user. In this cased, based on the user model and other considerations, computing device 110 may determine that the modality of presentation should be each user's computing device where, for example, each user may be presented with a different analogy as needed.

In some aspects, for example, computing device 110 may determine a user device that is currently in use and may use that device as the modality of presentation. For example, if the user is currently using a 3-D virtual reality headset at the time that a need for an analogy is determined by computing device 110, computing device may determine that the 3-D headset is in use and determine that the 3-D headset as the appropriate modality for presenting the analogy.

In some aspects, an interaction type and level with the presented analogy may be determined by computing device 110. For example, computing device 110 may present an analogy as described above and may continuously track or monitor user interaction and engagement based on the analogy. The tracked user interaction and engagement may include, for example, gestures, speech, or other similar interactions. The interactions may be monitored, for example, using sensing devices 122. In some aspects, the interactions may be monitored in a non-intrusive manner, for example, by using readily available sensing devices 122 found on a user's smart, mobile, and/or wearable devices.

In some aspects, computing device 110 may determine or receive feedback from the user or group of users to determine an effectiveness of an analogy. For example, when an analogy is presented to the user or group of users, computing device 110 may monitor the user or group of users using sensing device 122 to sense patterns or other information about the user or group of users. Based on the sensor data, computing device 110 may determine whether the analogy was effective in clarifying or explaining the concept. For example, biometric feedback may be sensed by sensing device 122 that indicates an understanding of the analogy. In some aspects, the user or group of users may also or alternatively submit feedback to computing device 110. For example, the feedback may indicate whether the analogy was correct and useful or not correct and not very useful to the user or group of users. In some aspects, the feedback may be submitted via an interface presented to the user by computing device 110. In some aspects, computing device 110 may employ advanced analytics algorithms, for example, based on the sensed user interactions with the analogy, user activities, or other similar data to further determine the success of the analogy.

In some aspects, sensing device 122 may sense voice communication, such as, for example, a user or group of users asking follow-up questions about the analogy. Using common voice to text translation software, computing device 110 may determine a context of the question. Based on the determined context, computing device 110 may determine whether the analogy has been useful to the user or group of users in understanding the concept. For example, if the context of the question indicates that the user is confused about the analogy and/or the concept, computing device 110 may use this information when searching for another analogy. For example, computing device 110 may store any determinations on the successfulness of the use of an analogy in memory 114, database 124, memory 154, or in any other location for later use when determining analogies. For example, sample cases of analogy use by computing device 110 may be used for training a machine learning algorithm that may be used by computing device 110 in future analogy determinations.

In some aspects, if the analogy presented by computing device 110 is determined by computing device 110 to not be successful, computing device 110 may employ a modification strategy to select a new analogy for presentation to the user or group of users. For example, computing device 110 may change one or more of the words or phrases in the analogy, may utilize additional or alternative symbols or objects related to the analogy, and/or may make other similar changes to the analogy. In some aspects, computing device 110 may additionally or alternatively present an entirely different analogy based on the received feedback.

In some aspects, memory 114, database 124, memory 154, and/or another storage location may include multimedia learning modules 126 that are executable by processor 112 to present a concept and analogies to the user or group of users in a computer based educational environment. Multimedia learning modules 126 may include, for example, activities, lessons, game scenarios, or other similar tools that may be used to present a concept to the user or group of users by computing device 110. In some aspects, multimedia learning modules 126 may include multisensory scenarios having animated analogies. As a user progresses through one or more of the multimedia learning modules 126, computing device 110 may assess the user's progress, e.g., via quizzes, tests, questions, or other similar methods, and may monitor the user, for example, via sensing devices 122, to determine whether the user requires further explanation or clarification of a concept. Based on the determination, computing device 110 may determine an analogy to be used to explain or clarify the concept and may present the analogy via the multimedia learning module 126 to the user, for example, via the animated analogy.

In some aspects, computing device 110 may present an analogy to the user via a pop-up or overlay on a presentation device 116. Computing device 110 may present a multimedia learning module 126 to a user on presentation device 116 for learning a particular concept. If computing device 110 determines that the user requires further explanation or clarification of the concept, an analogy may be presented to the user as a pop-up or overlay on presentation device 116 over of the presented multimedia learning module 126.

In some aspects, computing device 110 may determine what analogy to use to clarify or explain a particular concept through the use of conversational data mining. For example, computing device 110 may collect conversational data from the user using a sensing device 122, e.g., a microphone. Computing device 110 may digitize a speech waveform of the collected conversational data and may extract at least one acoustic feature from the digitized speech waveform. Acoustic attribute data corresponding to the acoustic feature, together with an identifying indicia or coding to facilitate subsequent data mining, may be stored in memory 114, database 124, memory 154, or in any other storage location. Acoustic attribute data may, for example, be combined with the sensor data, characteristic data, activity data, and social network data to form user attributes. User attributes may include, for example, age, accent, native language, dialect, socioeconomic classification, educational level, emotional state, and/or other features of the user that may be relevant to the determination of an analogy. The data gathering may be repeated for a large number of users to generate a data set of user attributes that may be used by system 100 to determine an appropriate analogy to be used in clarifying or explaining the concept. For example, the data set may be used to train a machine learning algorithm to identify and select appropriate analogies for clarifying or explaining a particular concept.

Figure 2:
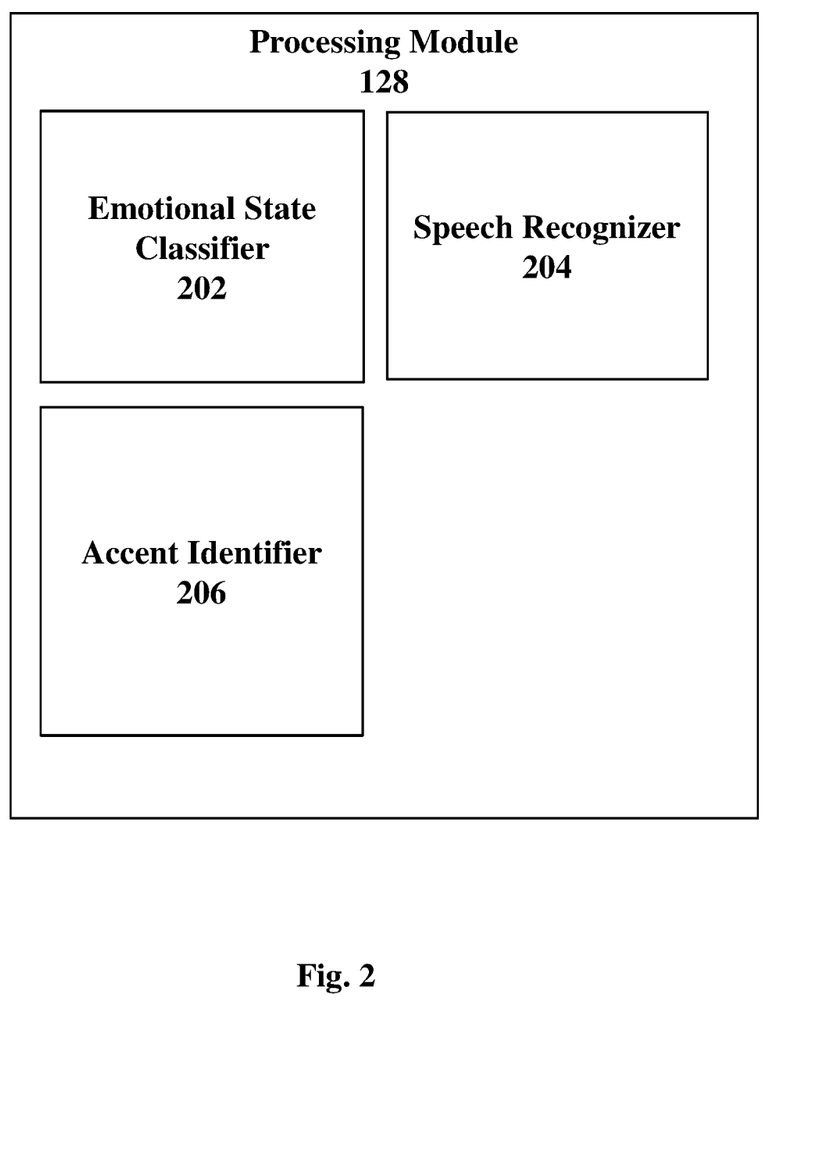
FIG. 2 is a system diagram of processing modules in accordance with an aspect of the present disclosure.

Memory 114 may store a processing module 128 that is configured analyze received sensor data, characteristic data, activity data, social network data, or other similar data that forms user attributes. With reference to FIG. 2, processing module 128 may include an emotional state classifier 202, a speech recognizer 204, and an accent identifier 206.

Emotional state classifier 202 may analyze the received sensor data to determine an emotional state of a user or group of users. For example, emotional state classifier 202 may analyze the data received from sensing devices 122 to determine an emotional state of a user or group of users. The determined emotional state may be a factor in determining whether the user or group of users require further clarification or explanation of a concept. The emotional data may be sensor data obtained from a sensor on the user device or obtained from a plurality of sensors on the user device. Using the sensor data, a neural network classifier or a machine learning classifier may be built for classifying emotional state of a user or group of users. The user characteristics data may be used to automatically classify or correspond speech, text and/or facial expressions to emotional states. Data about the emotional state of the user may be useful for selecting an analogy and modality for conveying the selected analogy to the user. Data about the emotional state of the user may also improve the human-computer interaction of the user by allowing the computing device 110 to be responsive to changes in the user's emotional state when presenting and/or modifying analogies. In some aspects, the emotional state may be determined using biological sensors that may continuously monitor the heart rate, breathing pattern, eye dilation, or other similar biological features of a user during the presentation of a concept to determine whether a change has occurred. For example, if a user experiences an increase in one or more of the user's heart rate, breathing, etc., as compared to a baseline level established by emotional state classifier 202 and/or computing device 110 prior to presenting the concept, this may be an indication that the user is experiencing confusion and/or anxiety about the concept or requires clarification of the concept. In addition, speech patterns, changes to the user's physical appearance, hand motions, eye motion, head motion, or other similar physical attributes of the user may be monitored by emotional state classifier 202 for changes from a baseline level established prior to presenting the concept. For example, if the user's speech is delayed when asked a question, if the user stutters and/or if the user pauses in response to a question about the concept for longer than a pre-determined threshold, emotional state classifier 202 may determine that the user's emotional state indicates confusion or a lack of understanding of the concept. As another example, if the user's body language indicates a lack of understanding or interest in the concept, e.g., the way the user's head is tilted, hand motions, the user sighing, the user looking away from the presented concept, etc., emotional state classifier 202 may determine that the user's emotional state indicates confusion or a lack of understanding of the concept. Based on the determination that the user's emotional state indicates confusion or a lack of understating in the concept, computing device may search database 124 for an appropriate analogy to explain or clarify the concept for the user.

Speech recognizer 204 analyzes the user or group of users' speech to determine, cluster or classify the user's or group of users' specific voice. For example, a neural network clustering technique or a classic method for recognizing or identifying the user that is speaking from a group of users may be employed by computing device 110 (e.g., using a mobile phone audio or speaker sensor). The identification of the user that is speaker may be used by computing device 110 when determining the successfulness of the analogy. For example, computing device 110 may determine that the analogy was or was not successful for the user based on the identification of the user as a speaker and an analysis of the users speech and may further fine-tune the presented analogy or an additional analogy to be presented to clarify the concept.

Accent identifier 206 analyzes the user or group of users' speech to determine an accent used by the user or group of users. For example, accent identifier 206 may analyze the digitized speech waveform and extracted acoustic features of the collected conversational data and may compare the analyzed data to a database of accents. The database of accents may be stored, for example, in memory 114, database 124, memory 154, or in any other location. In some aspects the database of accents may be part of the internet or stored on the cloud and may be searched by accent identifier 206 to determine whether the analyzed data matches a particular accent. When accent identifier 206 determines a match between the user or group of users' accent and an accent in the accent database, the accent of the user or group of users is identified and may be provided to computing device 110 for use in selecting an appropriate analogy for use with the user or group of users. The determined accent may be used by computing device 110 to fine-tune the final modality of the analogy for the concept. For example, computing device 110 may search database 124 for an appropriate analogy from a country that is the source of the identified accent.

In some aspects, a linguistics analyzer 130 may be stored in memory 114 and executable by processor 112. Linguistics analyzer 130 is configured to receive audio or acoustic data from sensing device 122 about the user or group of users' speech and to analyze the received audio or acoustic data using natural language processing tools and linguistics modules to determine a dialect and/or slang of the user or users. The determined dialect and/or slang of the users may used by system 100 when determining an analogy or metaphor to be presented. For example, an analogy or metaphor may be presented in the determined dialect or using the determined slang of the user or group of users. This may enhance the effect of the determined analogy or metaphor on providing the user or group of users a better understanding or clarification of the concept.

In some aspects, the analogies among entities may be determined by system 100 by obtaining associative counts among the entities and computing similarity measures among given entities and other entities, using the associative counts. For example, a first entity and a second entity may be identified as being analogies if the first entity has a strongest similarity measure with respect to the second entity and the second entity also has a strongest similarity measure with respect to the first entity. The similarity measure may be determined by system 100, for example, using normalized entropy inverted among a given entity or other entities.

In some aspects, system 100 may take into account the risk that an analogy may be misinterpreted by the user or group of users. For example, system 100 may set a threshold risk amount that the analogy will be misinterpreted. In some aspects, the threshold risk amount may be set by a user of system 100. A risk of misinterpretation for an analogy may be determined by system 100 by, for example, based on the user's user model, a context of the presentation, and other similar information. System 100 may compare the determined risk of misinterpretation for the analogy to the threshold risk amount to determine whether the analogy should be presented by system 100. For example, if the determined risk of misinterpretation for the analogy exceeds the determined threshold risk amount, system 100 may determine not to use the analogy and may instead search for another analogy to use. In another example, if the determined risk of misinterpretation for the analogy is equal to or below the determined threshold risk amount, system 100 may present the analogy to the user or group of users.

Figure 3:
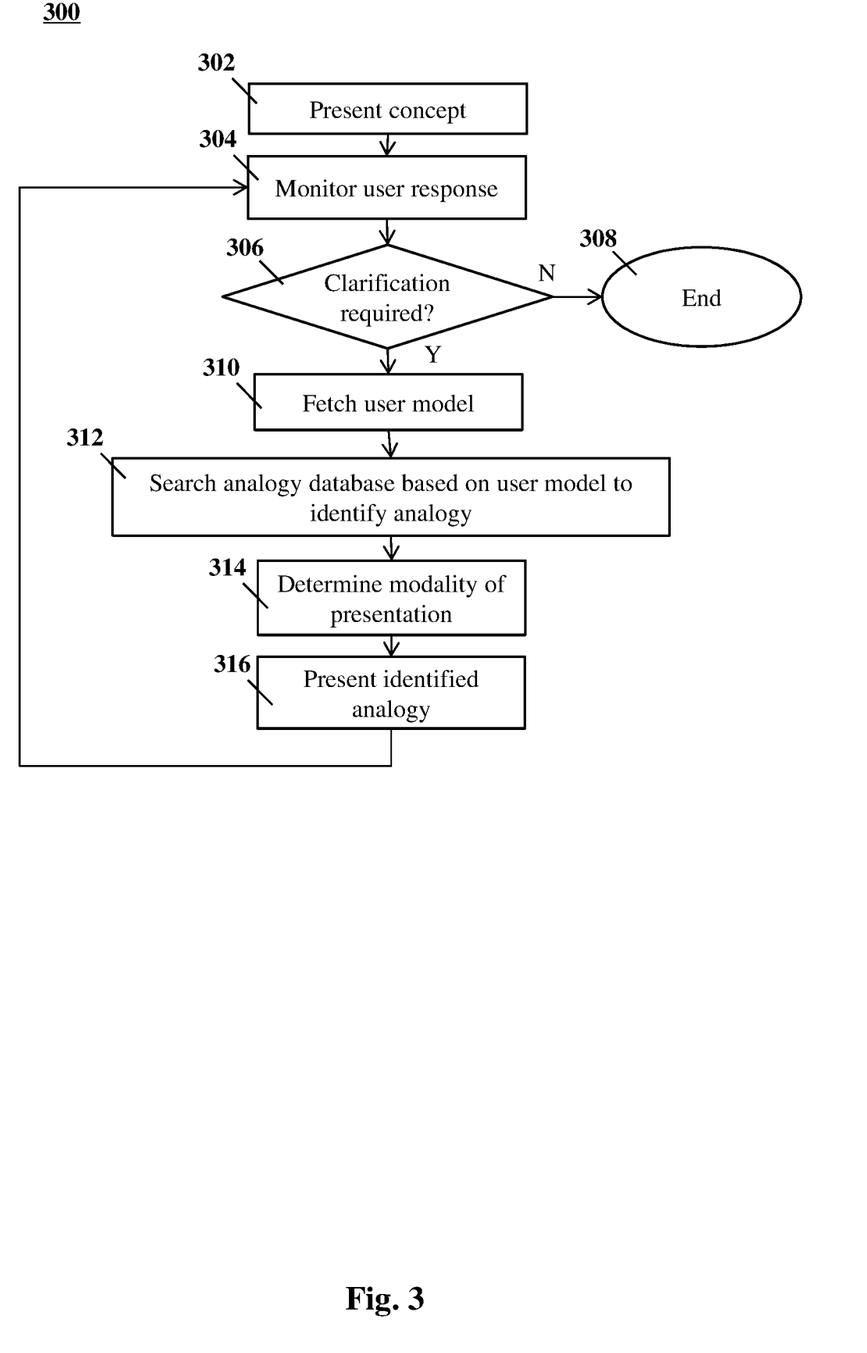
FIG. 3 is a flow chart illustrating an example method in accordance with an aspect of the present disclosure.

Referring now to FIG. 3, a method 300 is disclosed. At 302, a concept is presented to a user or group of users, for example, via one or more presentation devices 116. At 304, sensing devices 122 monitor the user or group of users' response to the concept in real-time as described above. At 306, computing device 110 determines whether clarification of the presented concept is required, for example, based on at least one of a facial expression, biometric reading, gesture, language, and/or feedback of the user as monitored by the sensing device 122 or received via input device 120. If computing device 110 determines that no clarification of the presented concept is required, method 300 proceeds to 308 and ends. If computing device 110 determines that clarification of the presented concept is required, method 300 proceeds to 310. At 310, computing device 110 fetches user models for the user or group of users from memory 114, database 124, memory 154, the internet, the cloud, or any other location that may store user models for the user or group of users. At 312, computing device 110 identifies an analogy that is configured to clarify the presented concept, for example, by searching an analogy database stored in memory 114, database 124, memory 154, the internet, the cloud, or any other location that may include an analogy database. At 314, computing device 314 determines a modality of presentation for the identified analogy. The modality may be determined based on, for example, the user models for the user or group of users, a context of the presentation of the concept, an available presentation device, or other similar considerations. For example, if the user or group of users are in a classroom having a smart board, the modality of presentation may be a visual and/or audio presentation on the smart board. Likewise, if the presentation of the concept to the user or group of users is via the user or group of users' smart devices, the modality of presentation may be visual and/or audio presentation on a display or via a speaker of the smart devices. At 316, the identified analogy is presented to the user or group of users in real-time via the determined modality, e.g., via one or more of presentation devices 116. For example, the identified analogy may be presented alongside the presented concept, as an overlay over the presented concept, via a separate presentation device 116, or any other similar manner. In some aspects, the method may return to 304 and computing device 110 may further monitor the user or group of users' response to the presentation of the identified analogy in real-time. For example, at 306 computing device 110 may determine whether the identified analogy is successful in clarifying the presented concept based on the monitoring of the user's response. If computing device 110 determines that the identified analogy is successful and no further clarification of the presented concept is required, method 300 may proceed to 308 and end. If computing device 110 determines that the identified analogy was not successful in clarifying the presented concept, method 300 may continue to 310-316 for further identification and presentation of an additional analogy to clarify the concept. Method 300 may again proceed to 304 for further monitoring of the user to determine whether additional clarification and/or analogies are required. In this manner, system 100 may automatically identify and present analogies to a user or group of users for clarifying a presented concept based on the monitoring of user responses using sensing devices.

Figure 4:
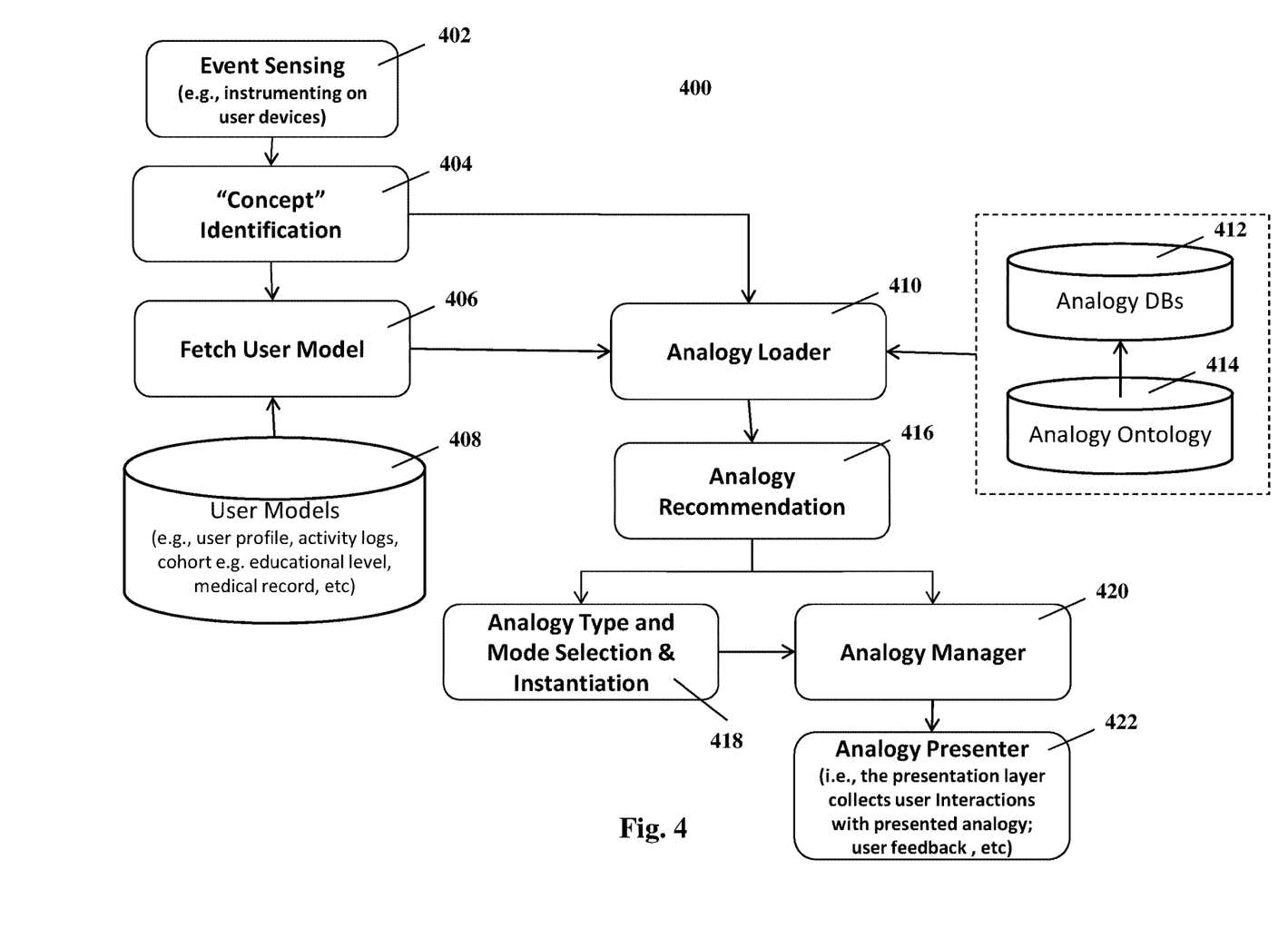
FIG. 4 is a diagram of a configuration implemented by the system of FIG. 1 in accordance with an aspect of the present disclosure.

Referring now to FIG. 4, an example configuration 400 implemented by system 100 is disclosed. Configuration 400 includes an event sensing component 402 that is configured to monitor a user or group of users using computing device 110, for example, using sensors 122, instrumenting the user's devices, etc. Event sensing element 402 may provide sensed data to a concept identification component 404 that is configured to identify a concept being presented to the user or group of users. The identified concept may be provided to a fetch user model component 406 and an analogy loader component 410. Fetch user model component 406 communicates with a database of user models 408. For example, fetch user model component 406 may transmit a request for the user models of the user or group of users from the database of user models 408 and may receive the requested user models form the database 408. Fetch user model component 406 may then provide the received user models for the user or group of users to the analogy loader component 410. Analogy loader 410 is configured to search an analogy database 412 and analogy ontology 414 for analogies matching the identified concept and received user models. Once analogies have been found by analogy loader component 410, they may be provided to analogy recommendation component 416. If an analogy is not found by analogy loader component 410, the system may recommend alternative analogies that may be close to the user or group matching criteria but not a direct match by applying advanced learning algorithms (e.g. similarity algorithms) which then may be provided to analogy recommendation component 416. Analogy recommendation component 416 may analyze the analogies found by analogy loader component 410 and select an appropriate analogy for recommendation to an analogy type and mode selection and instantiation component 418. Analogy type and mode selection and instantiation component 418 may determine a modality of presentation of the analogies, for example, based on the context, user model, user preferences, and type of analogy as described above, and may provide the determined modality of presentation to an analogy manager component 420. The recommended analogy may also be provided to analogy manager component 420 by analogy recommendation component 416. Analogy manager 420 may provide the recommended analogy and determined modality of presentation to an analogy presenter component 422, which may present the analogy to the user or group of users, e.g., via presentation device 116. Analogy presenter component 422 may also be configured to perform monitoring of the user's response to the presented analogy, for example, via sensors 122, input device 120, or in other similar manners as described above.

Figure 5:
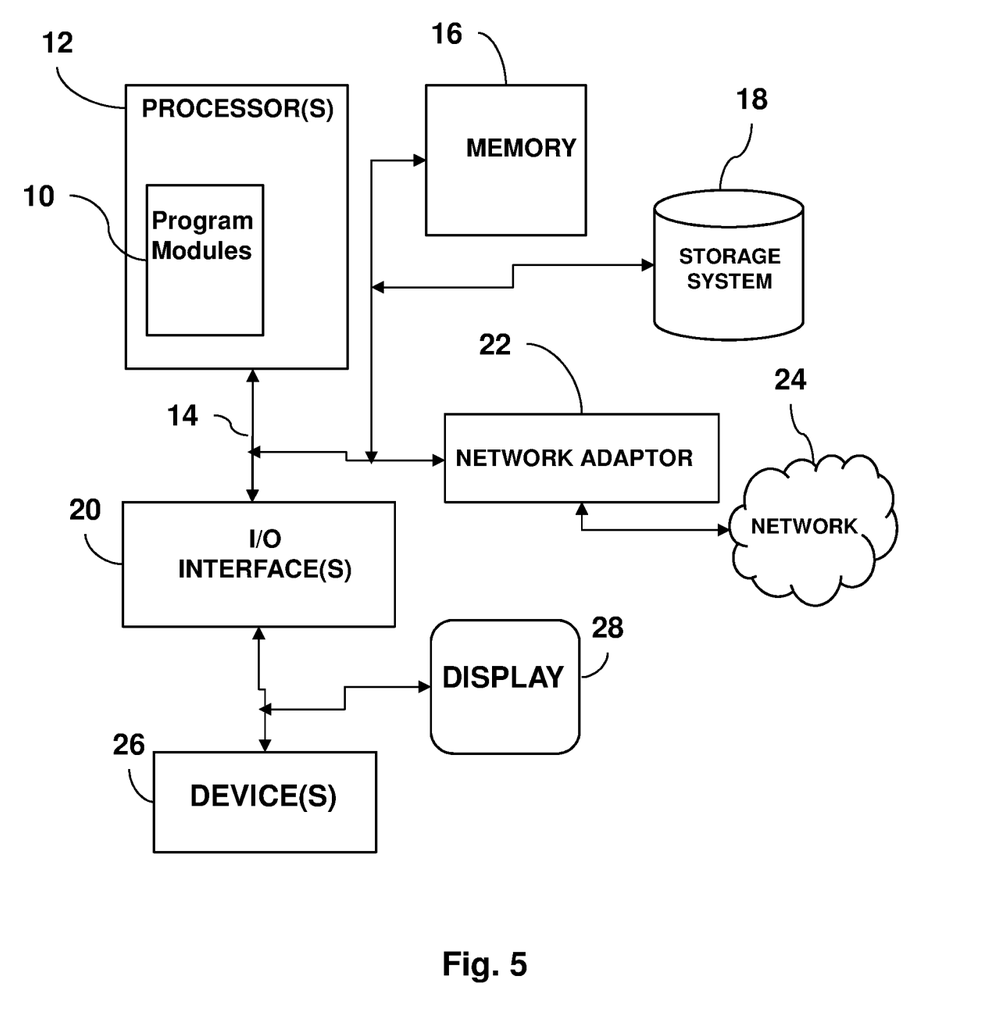
FIG. 5 illustrates a schematic of an example computer or processing system that may implement any component of the system of FIG. 1 in accordance with an aspect of the present disclosure.

FIG. 5 illustrates a schematic of an example computer or processing system that may implement any or all of system 100 including computing device 110 and server 150 in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the system shown in FIG. 1 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of the computer system may include, but are not limited to, one or more processors or processing units 12, a system memory 16, and a bus 14 that couples various system components including system memory 16 to processor 12. The processor 12 may include one or more program modules 10 that perform the methods described herein. The program modules 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

What is claimed is:

1. A method comprising:
   presenting a concept to a user via a presentation device;
   monitoring, via a sensing device, the user's response to the presentation of the concept, the sensing device generating sensor data based on the monitored user's response;
   determining, by at least one processor, based on the sensor data generated by the sensing device, that the user requires clarification of the presented concept;
   in response to determining that the user requires clarification of the presented concept, identifying, by at least one processor, an analogy that is configured to clarify the presented concept, the analogy including at least an exemplification of the presented concept, wherein a topic of the analogy is determined based on determining that a percentage of the user's social network is interested in the topic, and the identifying including at least searching by at least one processor a database storing analogies and numerical codes corresponding to the analogies in a format searchable by at least one processor, wherein the searching the database includes at least searching for a numerical code associated with an analogy from the numerical codes corresponding to the analogies, the numerical code corresponding to at least some of the sensor data associated with the user and a geographic region associated with the user; and
   presenting the identified analogy to the user via the presentation device.

2. The method of claim 1, wherein the determination that the user requires clarification of the presented concept is based on at least one of a facial expression, biometric reading, gesture, and language of the user monitored by the sensing device.

3. The method of claim 1, wherein the identification of the analogy is based on at least one of characteristic data of the user, activity data of the user, and social network data of the user.

4. The method of claim 3, wherein a mode of presentation of the analogy via the presentation device is automatically selected based on at least one of the characteristic data of the user, activity data of the user, and social network data of the user.

5. The method of claim 3, wherein the activity data is based on a monitoring of at least one of the user's hobbies, use of analogies, use of language, choice of words, communications, reading material, meetings, and culture.

6. The method of claim 3, wherein identifying the analogy includes searching the database based on at least one of the characteristic data of the user, activity data of the user, and social network data of the user.

7. The method of claim 1, further comprising:
   monitoring, via the sensing device, a user's response to the presentation of the identified analogy, the sensing device generating sensor data of the user's response to the identified analogy;
   determining, based on the generated sensor data of the user's response to the identified analogy, that further clarification of the presented concept is required;
   in response to determining that further clarification of the presented concept is required, identifying an additional analogy that is configured to clarify the presented concept; and
   presenting the identified additional analogy to the user via the presentation device.

8. A system comprising:
   at least one hardware processor;
   a presentation device coupled to the at least one hardware processor;
   a sensing device coupled to the at least one hardware processor;
   wherein the at least one hardware processor is programmed to:
   present a concept to a user via the presentation device;
   monitor the user's response to the presentation of the concept via the sensing device, the sensing device generating sensor data based on the monitored user's response;
   determine based on the sensor data generated by the sensing device, that the user requires clarification of the presented concept;
   in response to determining that the user requires clarification of the presented concept, identify an analogy that is configured to clarify the presented concept, the analogy including at least an exemplification of the presented concept, wherein a topic of the analogy is determined based on determining that a percentage of the user's social network is interested in the topic, and the at least one hardware processor is programmed to at least search a database storing analogies and numerical codes corresponding to the analogies in a format searchable by the at least one hardware processor, wherein the at least one hardware processor programmed to at least search a database includes the at least one hardware processor programmed to at least search for a numerical code associated with an analogy from the numerical codes corresponding to the analogies, the numerical code corresponding to at least some of the sensor data associated with the user and geographic region associated with the user; and
   present the identified analogy to the user via the presentation device.

9. The system of claim 8, wherein the determination that the user requires clarification of the presented concept is based on at least one of a facial expression, biometric reading, gesture, and language of the user monitored by the sensing device.

10. The system of claim 8, wherein the identification of the analogy is based on at least one of characteristic data of the user, activity data of the user, and social network data of the user.

11. The system of claim 10, wherein a mode of presentation of the analogy via the presentation device is automatically selected by the at least one hardware processor based on at least one of the characteristic data of the user, activity data of the user, and social network data of the user.

12. The system of claim 10, wherein the activity data is based on a monitoring of at least one of the user's hobbies, use of analogies, use of language, choice of words, communications, reading material, meetings, and culture.

13. The system of claim 10, wherein the hardware processor is programmed to identify the analogy at least by searching the database based on at least one of the characteristic data of the user, activity data of the user, and social network data of the user to identify the analogy.

14. The system of claim 8, wherein the at least one hardware processor is further programmed to:
   monitor the user's response to the presentation of the identified analogy via the sensing device, the sensing device generating sensor data of the user's response to the identified analogy;
   determine, based on the generated sensor data of the user's response to the identified analogy, that the identified analogy has not clarified the presented concept;
   in response to determining that the identified analogy has not clarified the presented concept, identify an additional analogy that is configured to clarify the presented concept; and
   present the identified additional analogy to the user via the presentation device.

15. A computer program product comprising a non-transitory computer readable storage medium having program instructions embodied therewith, the program instructions readable by a processor to cause the processor to:
   present a concept to a user via a presentation device;
   monitor, via a sensing device, the user's response to the presentation of the concept, the sensing device generating sensor data based on the monitored user's response;
   determine, by the processor, based on the sensor data generated by the sensing device, that the user requires clarification of the presented concept;
   in response to determining that the user requires clarification of the presented concept, identify, by the processor, an analogy that is configured to clarify the presented concept, the analogy including at least an exemplification of the presented concept, wherein a topic of the analogy is determined based on determining that a percentage of the user's social network is interested in the topic, the processor caused to identify the analogy by at least searching a database storing analogies and numerical codes corresponding to the analogies in a format searchable by the processor, wherein the searching the database includes at least searching for a numerical code associated with an analogy from the numerical codes corresponding to the analogies, the numerical code corresponding to at least some of the sensor data associated with the user and a geographic region associated with the user; and
   present the identified analogy to the user via the presentation device.

16. The computer program product of claim 15, wherein the determination that the user requires clarification of the presented concept is based on at least one of a facial expression, biometric reading, gesture, and language of the user monitored by the sensing device.

17. The computer program product of claim 15, wherein the identification of the analogy is based on at least one of characteristic data of the user, activity data of the user, and social network data of the user, wherein the processor is caused to search the database based on at least one of the characteristic data of the user, activity data of the user, and social network data of the user.

18. The computer program product of claim 17, wherein a mode of presentation of the analogy via the presentation device is automatically selected based on at least one of the characteristic data of the user, activity data of the user, and social network data of the user.

19. The computer program product of claim 17, wherein the activity data is based on a monitoring of at least one of the user's hobbies, use of analogies, use of language, choice of words, communications, reading material, meetings, and culture.

20. The computer program product of claim 15, wherein the processor is further caused to:

monitor, via the sensing device, a user's response to the presentation of the identified analogy, the sensing device generating sensor data of the user's response to the identified analogy;

determine, based on the generated sensor data of the user's response to the identified analogy, that the identified analogy has not clarified the presented concept;

in response to determining that the identified analogy has not clarified the presented concept, identify an additional analogy that is configured to clarify the presented concept; and present the identified additional analogy to the user via the presentation device.

* * * * *